United States Patent [19]
Yamada

[11] Patent Number: 5,843,495
[45] Date of Patent: Dec. 1, 1998

[54] HOT NOZZLE FOR USE WITH A SIDE-GATE RUNNERLESS INJECTION MOLDING SYSTEM

[76] Inventor: Fujio Yamada, 48, Toei 3-chome, Chiryu-shi, Aichi-ken, Japan

[21] Appl. No.: 807,529

[22] Filed: Feb. 28, 1997

Related U.S. Application Data

[63] Continuation-in-part of Ser. No. 511,218, Aug. 4, 1995, abandoned.

[30] Foreign Application Priority Data

Aug. 8, 1994 [JP] Japan .................................. 6-186072

[51] Int. Cl.⁶ ................................................. B29C 45/20
[52] U.S. Cl. ...................... 425/549; 264/328.15; 425/572
[58] Field of Search ..................... 425/549, 562, 425/563, 564, 566, 572, 588; 264/328.15

[56] References Cited

U.S. PATENT DOCUMENTS

| | | | |
|---|---|---|---|
| 4,212,624 | 7/1980 | Ando et al. | 425/563 |
| 4,648,833 | 3/1987 | Yamada | 425/549 |
| 5,435,711 | 7/1995 | Yamada | 425/549 |

Primary Examiner—Tim Heitbrink
Attorney, Agent, or Firm—Dennison, Meserole, Pollack & Scheiner

[57] ABSTRACT

A hot nozzle for use with a side-gate runnerless injection molding system includes a base portion and a nozzle portion adapted to be inserted into a nozzle hole formed in a mold. The base portion and the nozzle portion are formed by a tubular body made of a conductive metal having a predetermined electrical resistance. The tubular body has outlet holes formed in a front part of the nozzle portion and opened in a lateral side thereof. At least one pair of longitudinal slits extend substantially over the length of the tubular body in an axial direction thereof except at least the front part of the nozzle portion to divide said body into at least two sections. Each of the sections includes a device for connection to a source of electric power, so that the tubular body is heated mainly at the front part of the nozzle portion when electric power is applied between two sections of the tubular body divided by the slits. Each of the slits has a front portion including a pair of bifurcated parts. Each of the bifurcated parts includes a front end positioned adjacent corresponding one of the outlet holes.

4 Claims, 10 Drawing Sheets

HOT NOZZLE FOR USE WITH A SIDE-GATE RUNNERLESS INJECTION MOLDING SYSTEM

This application is a continuation-in-part of Ser. No. 08/511,218, filed Aug. 4, 1995, now abandoned.

BACKGROUND OF THE INVENTION

1. Field of the Invention

The present invention related to a hot nozzle for use with a side-gate runnerless injection molding system.

2. Description of the Prior Art

In a runnerless injection molding system in which no runner is produced by charging a molten resin injected from an injection molding machine into a mold via a hot nozzle, the prior art has proposed to incorporate a side-gate mold for cutting a gate of a molded product simultaneously with completion of a molding process. To this end, an outlet opening of the hot nozzle is formed on a lateral side of a nozzle portion of the hot nozzle, and a gate hole of the mold is positioned to correspond to the outlet opening of the hot nozzle in facing relationship therewith. The hot nozzle and the mold (a fixed mold half or a movable mold half) is moved relative to each other to sever the hardened resin by a shearing force at a boundary surface between the outlet opening of the hot nozzle and the gate hole of the mold.

This system incorporating the side-gate mold is generally satisfactory in avoiding stringiness of the molten resin since the gate is severed simultaneously with completion of the molding process. However, it is difficult to put this system into practical use.

Thus, in order to sever the gate by the shearing force, the gate must have a softness to some extent. However, since the mold is cooled when the gate is severed, the resin within the gate hole of the mold is cooled and hardened. Additionally, since the front part of the hot nozzle contacts an inner wall of a nozzle hole of the mold into which the gate hole is opened, the front part of the hot nozzle is cooled by the mold, so that the resin within the outlet hole of the hot nozzle is also hardened. For this reason, it is very difficult to sever the gate by the shearing force. In fact, it is almost impossible to apply this system to a molding process of a plastic material called "engineering plastic" having a high melting point.

In order to hold the gate in a soft condition, the prior art has proposed to increase the temperature of the hot nozzle. The hot nozzle includes a heater mounted thereon, and the temperature of the hot nozzle may be increased by increasing the temperature of the heater. However, when the temperature of the heater is increased to heat the gate which is cooled by the mold as described above, there will be some possibility that the resin within substantial part of the hot nozzle which does not contact the mold is heated excessively to cause heat decomposition.

To avoid the heat decomposition, an additional heater may be incorporated for locally heating the front part of the hot nozzle in contact with the mold. However, the incorporation of such additional heater involves the problem that the heater must be positioned at very limited area for heating the front part and Therefore, it is physically impossible to mount the additional heater on the hot nozzle.

SUMMARY OF THE INVENTION

It is, accordingly, an object of the present invention to provide a hot nozzle for use with a side-gate runnerless injection molding system which is operable to maintain the temperature of a gate of a molded product at a suitable temperature for severing the gate by a shearing force.

It is another object of the present invention to provide a hot nozzle which is adapted for molding a plural number of products and which is adapted for severing the gates of the products at one time.

It is also an object of the present invention to provide a hot nozzle which serves to mold a plural number of products at a time with stable quality and which provides smooth severed surfaces for all gates of the products.

According to the present invention, there is provided a hot nozzle for use with a side-gate runnerless injection molding system wherein a molten resin injected from an injection molding machine is charged into cavities of a mold via the hot nozzle in a lateral direction therefrom, and wherein gates of molded products are severed by a relative movement between the hot nozzle and the mold, comprising:

a base portion; and a nozzle portion adapted to be inserted into a nozzle hole formed in the mold;

the base portion and the nozzle portion being formed by a tubular body made of a conductive metal having a predetermined electrical resistance, the tubular body including a plurality of outlet holes formed in a front part of the nozzle portion and opened in a lateral side thereof, and including at least one pair of longitudinal slits extending substantially over the length of the tubular body in an axial direction thereof except at least the front part of the nozzle portion to divide the body into at least two sections, each of the sections including a device for connection to a source of electric power, so that the tubular body is heated mainly at the front part of the nozzle portion when electric power is applied between two sections of said tubular body divided by the slits, each of the slits having a front portion including a pair of bifurcated parts, and each of the bifurcated parts including a front end positioned adjacent corresponding one of the outlet holes.

The invention will become more apparent from the appended claims and the description as it proceeds in connection with the drawings.

DETAILED DESCRIPTION OF THE PREFERRED EMBODIMENT

An embodiment of the present invention will now be explained with reference to the accompanying drawings.

Figure 1:
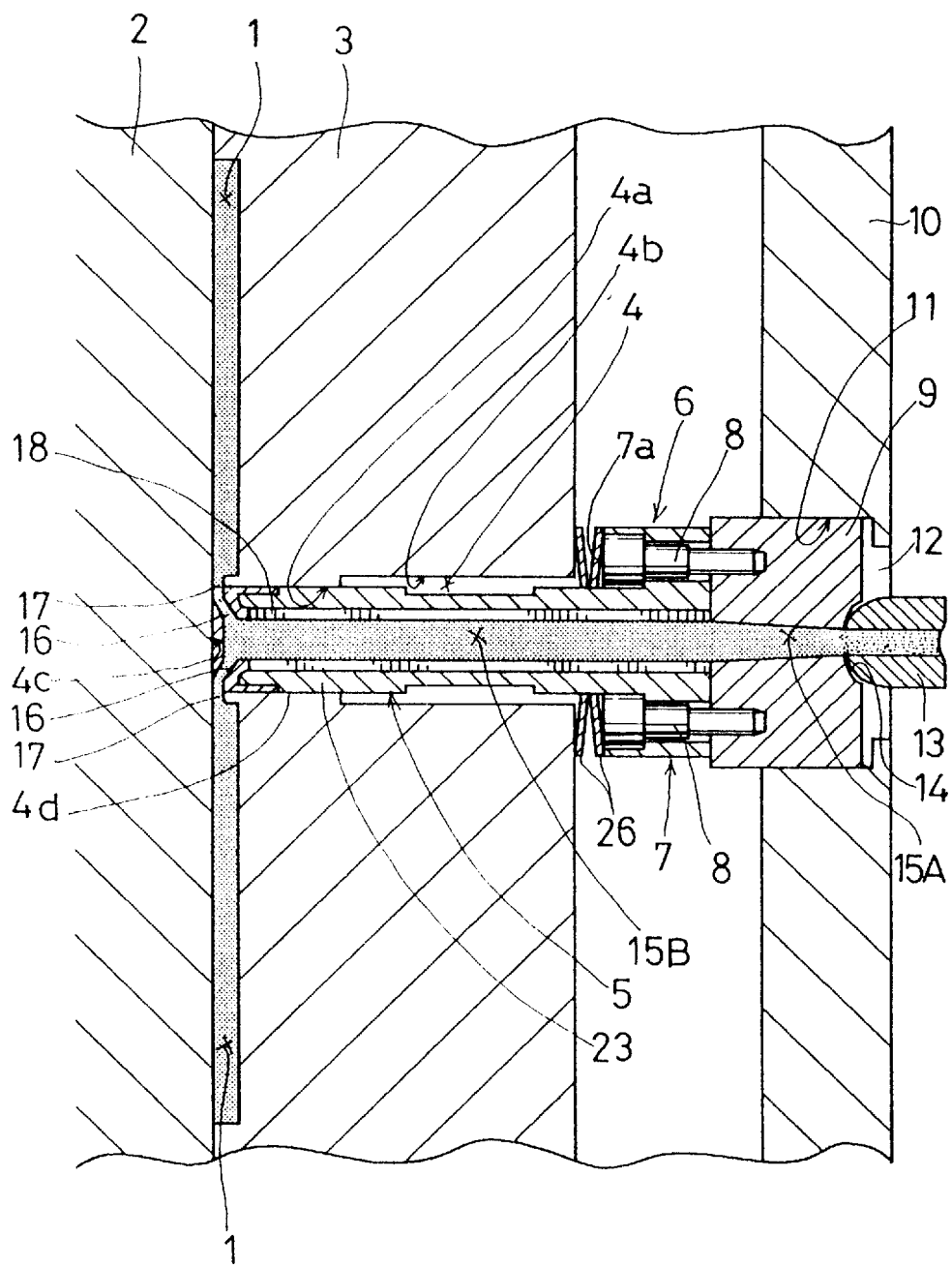
FIG. 1 is a sectional view of a side-gate runnerless injection molding system incorporating a hot nozzle according to an embodiment of the present invention.

Referring to FIG. 1, the essential parts of a runnerless injection molding system having a side-gate mold is shown in sectional view. The side-gate mold includes a movable mold half 2 and a fixed mold half 3 which form a pair of cavities 1 therebetween. The cavities 1 are positioned in opposed relationship with each other in a vertical direction and extend within one plane. A hot nozzle 6 has a tubular nozzle portion 5 which is inserted into a nozzle hole 4 formed in the fixed mold half 3 at a central position between the cavities 1. The nozzle hole 4 includes a small diameter part 4a and a large diameter part 4b exposed to the outside. The outer surface of a front part of the nozzle portion 5 of the hot nozzle 6 slidably contacts the inner peripheral surface of the small diameter part 4a of the nozzle hole 4 and has a diameter substantially the same as the small diameter part 4a. A space is formed between the inner peripheral surface of the large diameter part 4b of the nozzle hole 4 and the outer surface of the nozzle portion 5. The hot nozzle 6 has an annular base portion 7 positioned rearwardly of the nozzle portion 5 and having a larger diameter than the latter. The base portion 7 is positioned outwardly of the nozzle hole 4 and is fixed to a manifold 9 by means of bolts 8. The manifold 9 is slidably fitted into a recess 11 formed in a fixed base 10 of the mold and is slidably movable relative to the recess 11 in an axial direction of the nozzle hole 4. The recess 11 has a longitudinal extent perpendicular to the sheet of the drawing showing FIG. 1. A through hole 12 is formed on the bottom of the recess 11 and is open on the side of an injection nozzle 13 of an injection molding machine (not shown). A depression 14 is formed on a rear surface of the manifold 9 for receiving a front end of the injection nozzle 13.

The manifold 9 and the hot nozzle 6 have channels 15A and 15B formed therein, respectively. The channels 15A and 15B are connected in series for receiving the molten resin injected from the injection nozzle 13. While not shown in the drawings, a plural number of the hot nozzles 6 are mounted on the manifold 9 and are arranged in parallel relationship with each other in the direction perpendicular to the sheet of the drawing showing FIG. 1. The manifold 9 has a plural number of the channels 15A corresponding to the number of the hot nozzles 6 and the channels 15A are connected in series with each other by a connecting channel (not shown) formed in the manifold 9, so that each channel 15A receives a supply of the molten resin from the injection nozzle 13. In this connection, the mold includes a plural number of the nozzle holes 4 and plural pairs of the cavities 1 corresponding to the number of the hot nozzles 6. For purposes of explanation, reference will hereinafter be made to one set of the hot nozzle, 6, the nozzle hole 4 and the pair of the cavities 1.

A pair of outlet holes 16 are formed on the front end of the nozzle portion 5 of the hot nozzle 6 in opposed relationship with each other in a diametrical direction of the nozzle portion 5. The outlet holes 16 extend obliquely outwardly in a forward direction as viewed in FIG. 3 and extend radially outwardly in a front view (as viewed from the left in FIG. 2). Here, the outlet holes 16 are positioned in alignment with longitudinal slits 19 in an axial direction of the hot nozzle 6. The longitudinal slits 19 will be explained later. In the state of FIG. 1 where the front end of the nozzle portion 5 is in abutment on a bottom wall 4c of the nozzle hole 4, the outlet holes 16 are in communication with their corresponding cavities 11 via a pair of gate holes 17 formed in the inner peripheral wall 4d of the small diameter part 4a of the nozzle hole 4 adjacent the bottom wall 4c.

Figure 2:
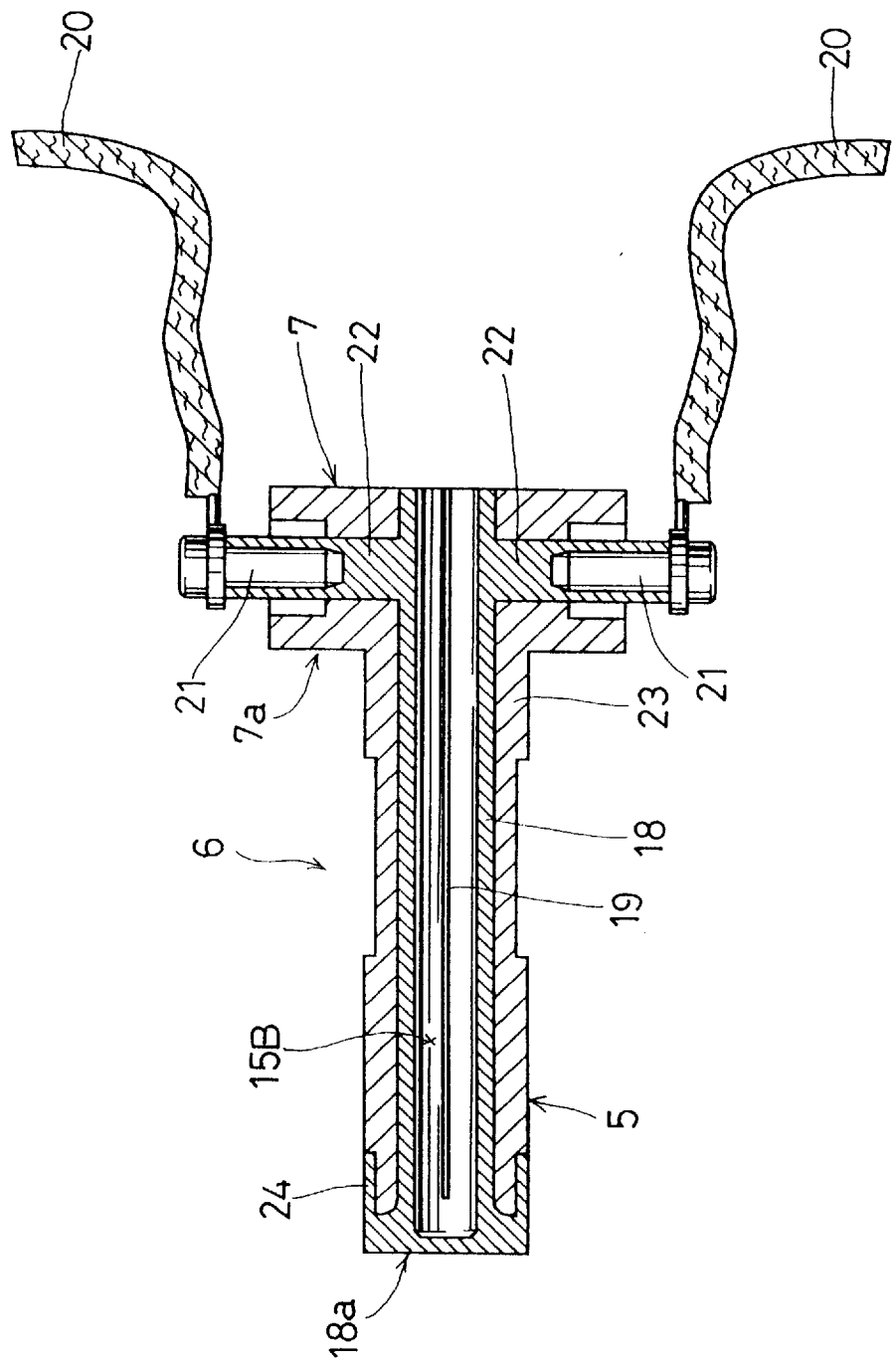
FIG. 2 is an enlarged horizontal sectional view of the hot nozzle shown in FIG. 1.
Figure 3:
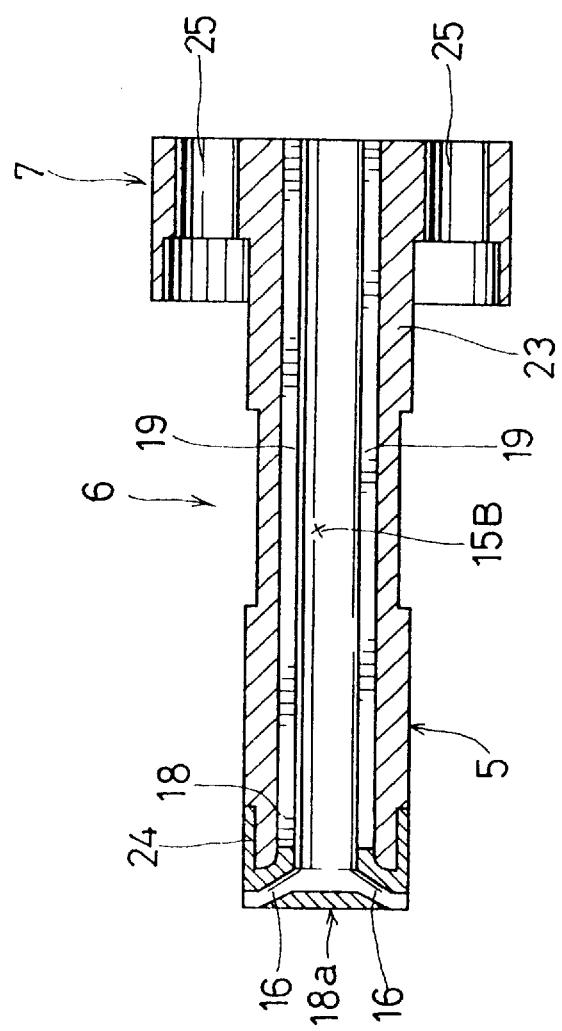
FIG. 3 is a vertical sectional view of FIG. 2.
Figure 4:
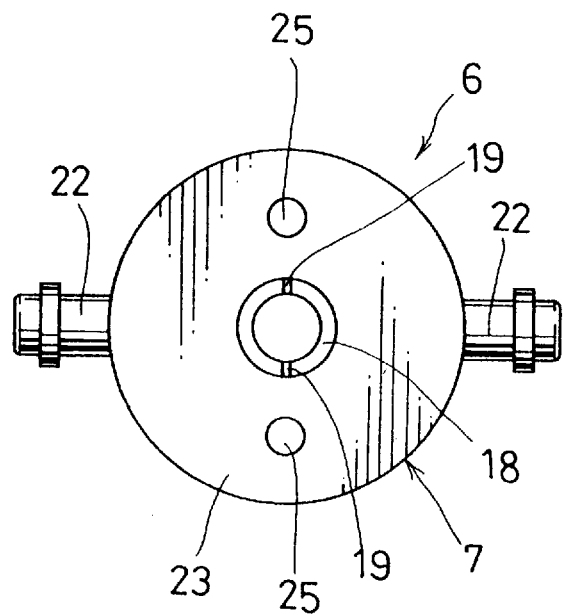
FIG. 4 is a right side view of FIG. 3.

The construction of the hot nozzle 6 will now be explained with reference to FIGS. 2 to 4. The hot nozzle 6 includes a tubular body 18 made of a conductive metal having a predetermined electrical resistance. The body 18 has a flat front surface 18a forming a front surface of the nozzle portion 5 for abutment on the bottom wall 4c of the nozzle hole 4. A pair of the longitudinal slits 19 are formed in the body 18 in diametrically opposed relationship with each other and extend from the rear end of the body 18 to the front end thereof except a portion of the front end. As shown in FIG. 2, a pair of connecting portions 22 are formed integrally with the body 18 on the side of the base portion 7 and protrude outwardly therefrom. The connecting portions 22 are opposed to each other in a diametrical direction of the body 18 which is perpendicular to the diametrical direction across the slits 19. A pair of lead wires 20 are connected to the connecting portions 22 via respective terminals 21 on one side and are connected to a power source and the ground, respectively, via a temperature control unit (not shown) on the other side, so that the body 18 itself generates heat mainly at the front part of the nozzle portion 5 when a power (of low voltage and high current) is supplied to the body 18 via the temperature control unit and the lead wires 20. Here, the body 18 has a relatively thin thickness and therefore has relatively small heat capacity. For this reason, the temperature of the body 18 is increased and decreased in a very short time, so that an accurate temperature control can be achieved through adjustment of the power to be supplied. In this connection, the temperature control unit determines the heating current based on the temperatures detected by thermocouples (not shown) which are mounted on appropriate positions (such as the front part and the central portion) of the hot nozzle 6. Here, the outlet holes 16 are formed in the front end of the body 18, and the channel 15B of the molten resin is formed within the body 18 in the axial direction.

The outer surface of the body 18 is coated with a film (not shown) made of a thermal and electrical insulation material except the outer end of the connecting portions 22 for connecting the lead wires 20. Such a film may be formed by hot spraying to deposit fine ceramic powder on the outer surface of the body 18. A protection tube 23 made of ceramic or iron is fitted on the body 18 except the front portion of the body 18 having the outlet holes 16. Further, the front portion of the body 18 has a diameter greater than the remaining portion and includes an annular part 24 which is formed integrally with the front portion and which extends rearwardly therefrom. The front end of the protection tube 23 has a reduced diameter and is in engagement with the annular part 24 of the body 18, so that the outer surface of the protection tube 23 is flush with the outer surface of the front portion of the body 18. Further, as shown in FIGS. 3 and 4, a part of the protection tube 23 forming the base 7 of the hot nozzle 6 includes a pair of insertion holes 25 which receive the respective bolts 8 for fixing the hot nozzle 6 to the manifold 9.

Figure 5:
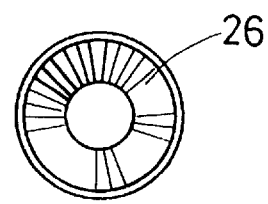
FIG. 5 is a front view of one or belleville springs shown in FIG. 1.
Figure 6:
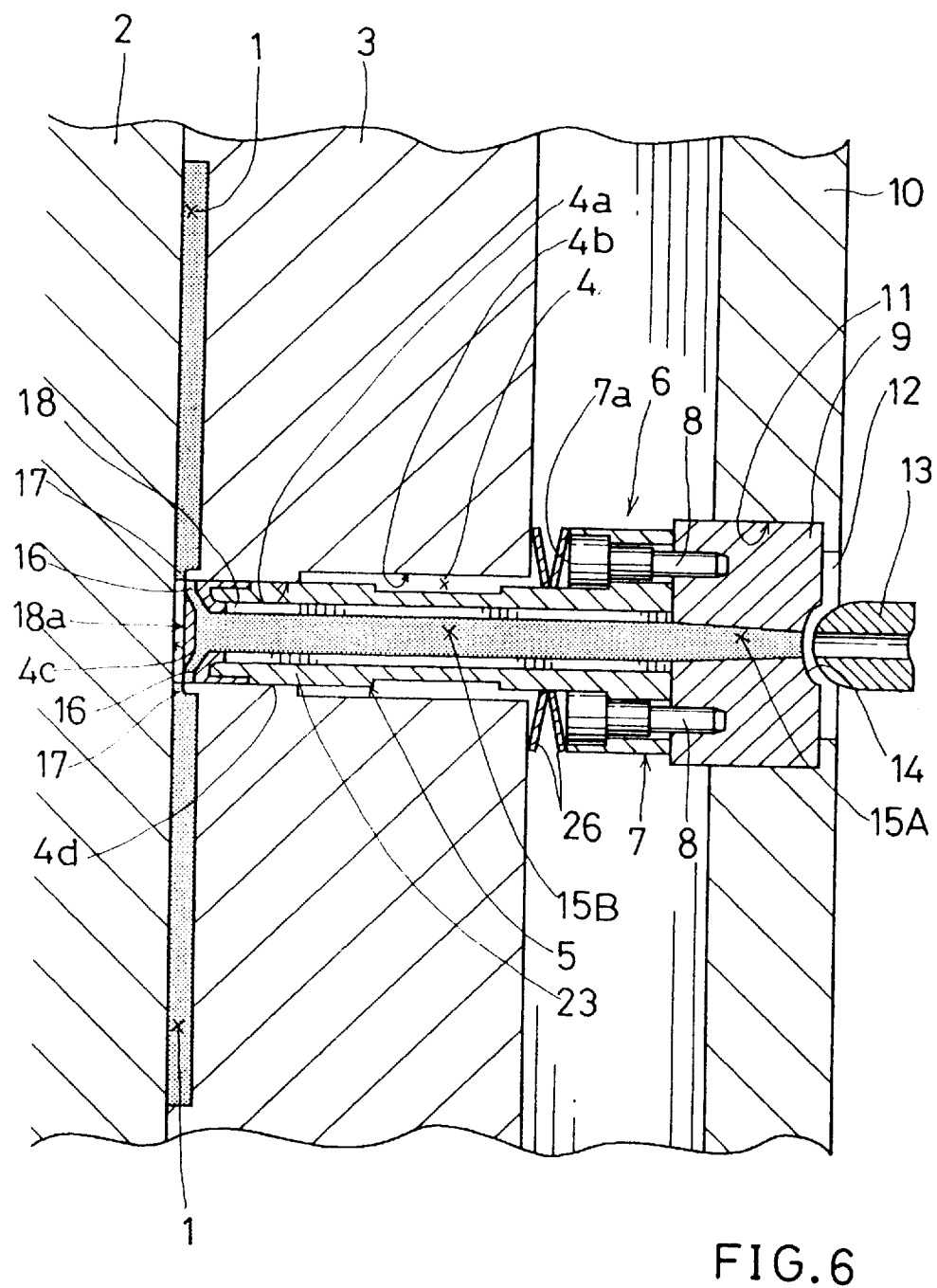
FIG. 6 is a view similar to FIG. 1 but showing the hot nozzle in the retracted position.

As shown in FIG. 1, two belleville springs 26 are interposed between the outer surface of the fixed mold half 3 about the nozzle hole 4 and an annular front surface 7a of the base portion 7 of the hot nozzle 6. FIG. 5 shows one of the belleville springs 26 in front view. The belleville springs 26 are coaxially fitted on the nozzle portion 5 with their vertexes facing to each other. The belleville springs 26 serve to force rearwardly the hot nozzle 6 and manifold 9 to which the hot nozzle 6 is mounted, so that the hot nozzle 6 is normally held at a retracted position where the manifold 9 abuts on the bottom of the recess 11 as shown in FIG. 6. At the retracted position, the outlet holes 15 of the hot nozzle 6 are not in alignment with their respective gate holes 17 and are closed by the peripheral wall 4d of the small diameter part 4a of the nozzle hole 4. The number of the belleville springs 26 may be selectively determined in response to the pressing force applied from the injection nozzle 13 to the hot nozzle 6 via the manifold 9 or in response to the injection molding machine to be adapted. In any cases, the belleville springs 26 are arranged in series in the axial direction such that two adjacent belleville springs 26 are facing to each other with their position reversed to each other.

The operation of the above embodiment will now be explained. In the state where the molding cycle is not started, the injection molding machine is positioned away from the manifold 9, so that the hot nozzle 6 is held in the retracted position shown in FIG. 6 by the biasing force of the belleville springs 26.

When the molding cycle is started, the injection machine is moved forwardly toward the manifold 9, so that the injection nozzle 13 is brought to engage the depression 14 and abuts on the bottom thereof and that the manifold 9 is moved forwardly together with the hot nozzle 6 against the biasing force of the belleville springs 26. The hot nozzle 6 is thus moved forwardly form its retracted position.

The forward movement of the hot nozzle 6 is stopped when the front surface of the hot nozzle 6 or the front surface 18a of the body 18 abuts on the bottom surface 4c of the nozzle hole 4, so that the outlet holes 16 of the nozzle portion 5 are brought into alignment with their respective gate holes 17.

The power of low voltage and high current is then applied to the hot nozzle 6 via the lead wires 20, so that the body 18 is heated mainly at the front part of the nozzle portion 5. Thereafter, the molten resin is injected from the injection nozzle 13. The molten resin flows through the channel 15A of the manifold 9 and the channel 15B of the hot nozzle 6 into the cavities 1 via their respective outlet holes 16 and the gate holes 17. Since the hot nozzle 6 is heated through application of the power, the molten resin smoothly flows into the cavities 1 while maintaining the suitable melting condition.

When the charging process of the molten resin into the cavities 1 is completed and stopped, cooling water is supplied to flow through the mold including the movable mold half 2 and the fixed mold half 3, so that the charged resin is solidified. At this stage, although the front part of the nozzle portion 5 is cooled through contact with the peripheral surface 4d of the small diameter part 4a of the nozzle hole 4, the resin within the outlet holes 16 and the gate holes 17 is held in a semi-solidified state since the power is still applied to the hot nozzle 6 at this stage. Irrespective of the continuous application of the power to the hot nozzle 6, the temperature of the hot nozzle 6 at a substantial part other than the front part thereof does not become excessive and the resin within this part does not cause heat decomposition since the hot nozzle 6 is heated mainly at the front part thereof.

When the injection machine is retracted from the molding system or when the injection nozzle 13 is moved away from the manifold 9 after completion of the cooling process of the mold, the hot nozzle 6 is retracted from the mold by the returning force of the belleville springs 26. With such a retracting movement, the outlet holes 16 are displaced from their respective gate holes 17 rearwardly, so that the semi-solidified resin extending from the outlet holes 16 to their respective gate holes 17 is severed by a shearing force at a boundary surface therebetween. Here, the boundary surface has a configuration corresponding to a part of a cylinder and therefore, a smooth severed surface of the semi-solidified resin is obtained through cooperation between a front edge of an opening of each outlet hole 16 and a rear edge of an opening of its corresponding gate hole 17.

Figure 7:
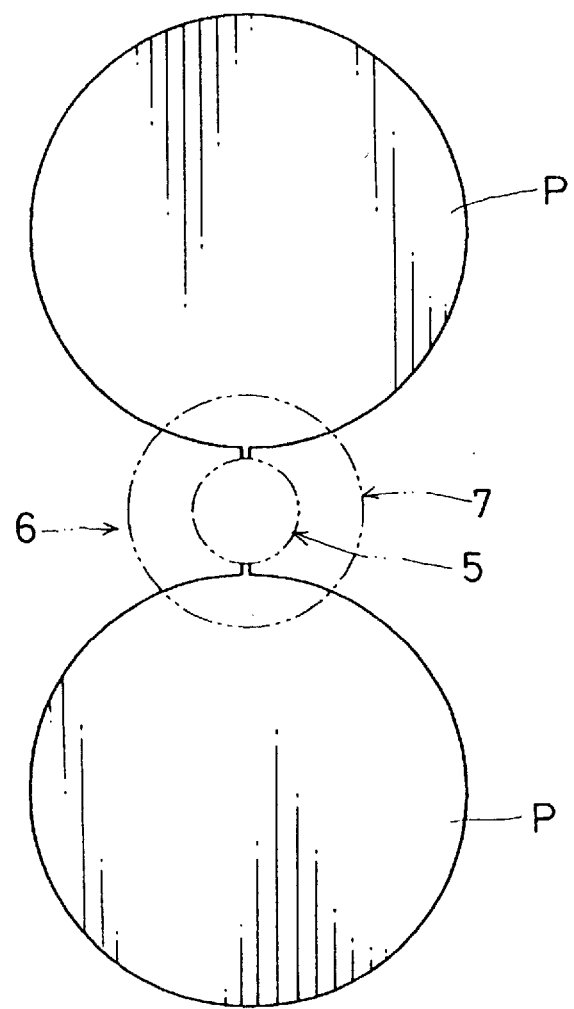
FIG. 7 is a side view of products obtained by the system shown in FIG. 1.

Thereafter, the application of power to the hot nozzle 6 is stopped and the movable mold half 2 is moved forwardly to open the mold for taking out the solidified resin within the cavities 1 or molded products P shown in FIG. 7. Since the severing operation of the gates of these products P is performed through cooperation between the front edge of the opening of each outlet hold 16 and the rear edge of the opening of its corresponding gate hole 17 as described above, two products P having smooth severed surfaces can be obtained at a time.

With the above embodiment, the arrangement of the gate holds 17 as well as the arrangement of the outlet holes 16 is very simple since one set of the gate hole 17 and the outlet hole 16 and the other set of the gate hole 17 and the outlet hole 16 are positioned in one plane perpendicular to the axial direction of the hot nozzle 6. However, one set of the gate hold 17 and the outlet hole 16 may be displaced from the other set in the axial direction.

After taking out the products P from the mold, the movable mold half 2 is moved rearwardly to close the mold for restarting the molding cycle. Then, the injection machine is moved forward toward the manifold 9, and the hot nozzle 6 is pressed forwardly against the biasing force of the belleville springs 26 to reach an advanced position shown in FIG. 1. Then, the power is applied to the hot nozzle 6 so as to be heated. Here, although the resin injected at the previous forming cycle may still remain within the hot nozzle 6 when starting the next cycle, such residual resin may not cause any problem since it is melted by heat of the hot nozzle 6 before a newly injected resin enters the hot nozzle 6. More importantly, since the hot nozzle 6 is heated mainly at the front end of the nozzle portion 5, the residual resin within the outlet holes 16 can be sufficiently heated to be melted. For this reason, the subsequent injection of the new molten resin from the injection nozzle 13 can be smoothly performed, and the resin may smoothly flow into the cavities 1 via the outlet holes 16 and the gate holes 17.

Although in the above embodiment, a pair of slits 19 are formed in the hot nozzle 6 in opposed relationship with each other in the diametrical direction and the outlet holes 16 are provided in pair correspondingly, a plural pairs of the slits 19 may be provided such that the slits 19 are equally spaced from each other in the circumferential direction. In such a case, the power of low voltage and high current is applied between each two of separated sections of the body 18 which are diametrically opposed to each other.

Figure 8:
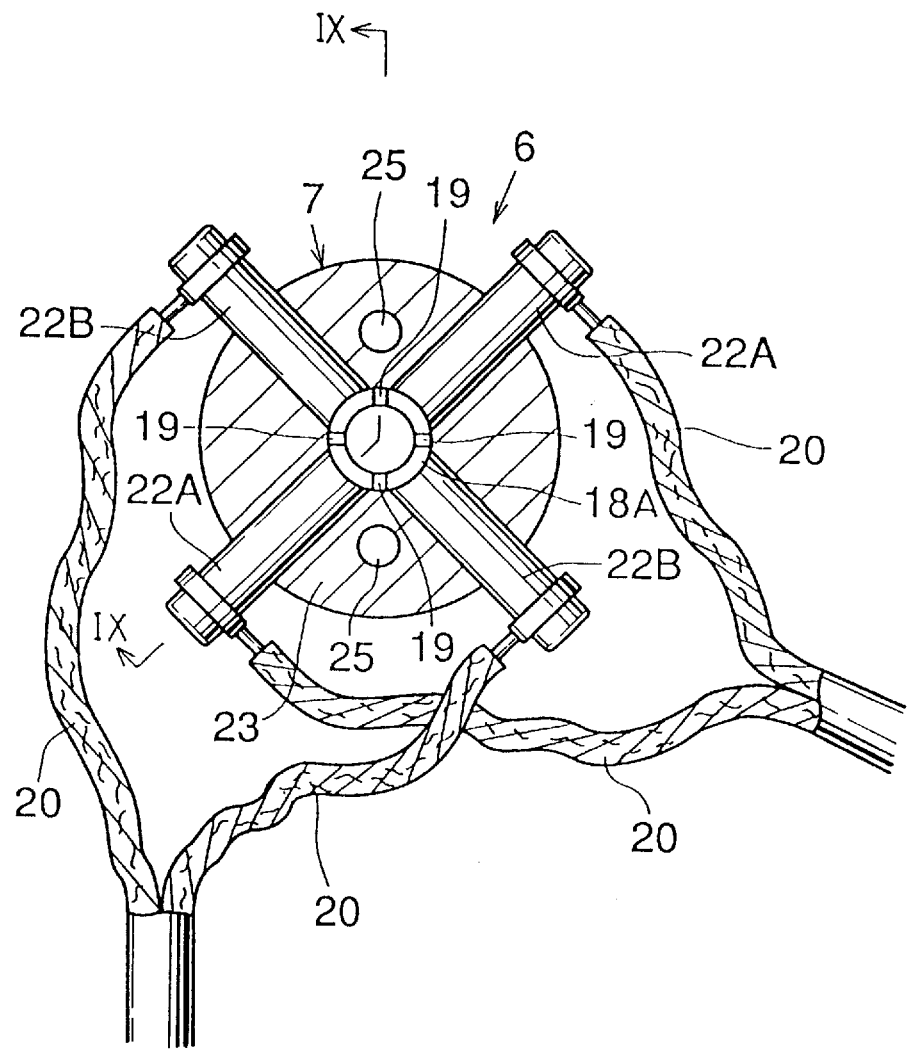
FIG. 8 is a sectional view of the essential parts of a hot nozzle having two pairs of longitudinal slits according to a modification of the embodiment.
Figure 9:
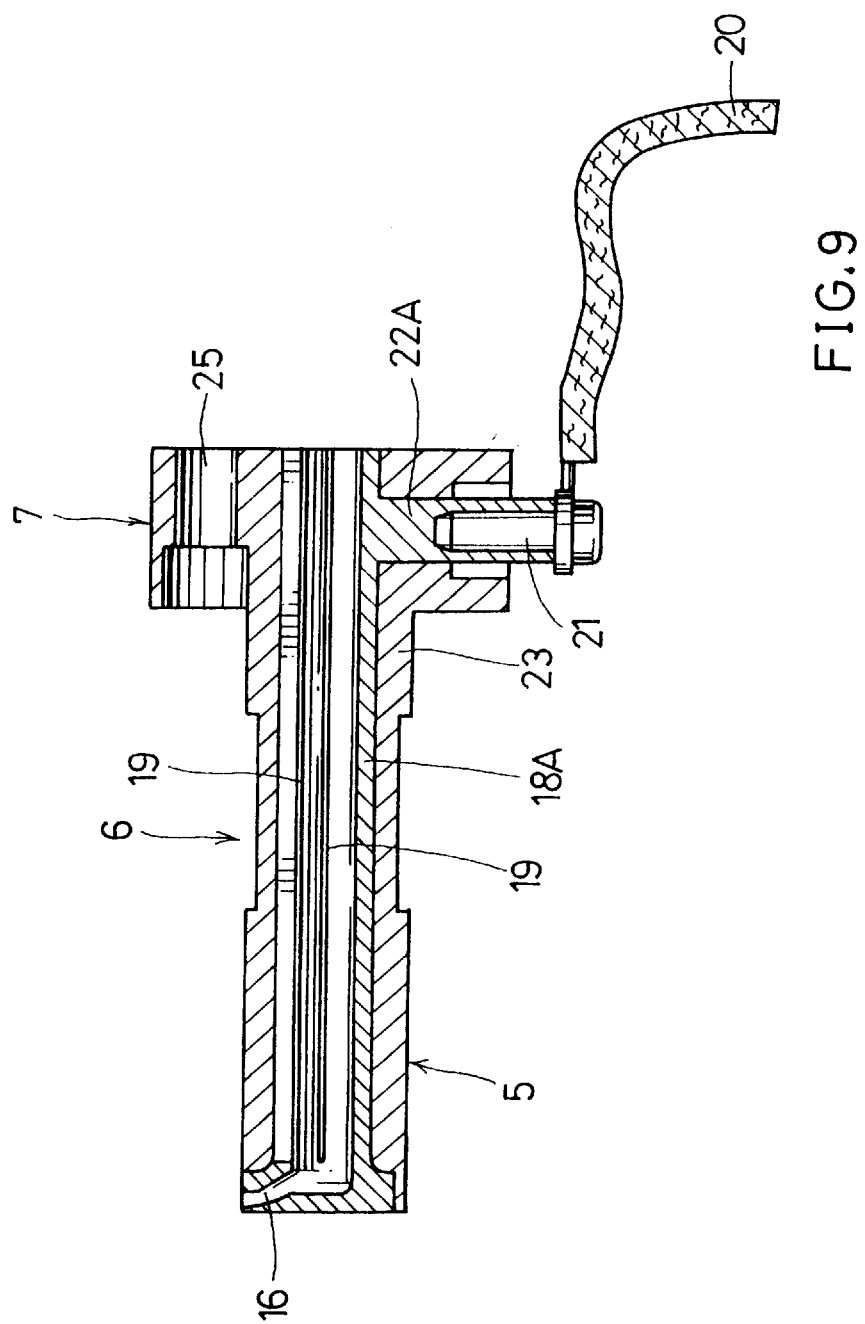
FIG. 9 is a sectional view taken along line IX—IX in FIG. 8.

FIGS. 8 and 9 shows a modification of the hot nozzle 6 of the above embodiment which incorporated a plural pairs of the slits 19. The basic construction of this modification is the same as the above embodiment, and in FIGS. 8 and 9, parts that are the same as those of the above embodiment are given like reference numbers. In this embodiment, two pairs of the slits 19 are provided, so that a body 18A is divided into four sections. The power of low voltage and high current is applied between a first diametrically opposed pair of the sections through connecting portions 22A and between a second diametrically opposed pair of the sections through connecting portions 22B, respectively. In this embodiment, the body 18 does not include the annular portion 24 as the first embodiment but the protective tube 23 extends to cover the front end of the body 18 except portions where the outlet holes 16 are formed.

If three pairs of the slits 19 are provided, the body 18 is divided into six sections, and the power is applied between each two of the sections which are diametrically opposed to each other in the same manner as the above embodiment except that a three-phase current power source is utilized as the power source.

In either cases, the outlet holes 16 are formed in the front end of the nozzle portion 5 at positions in alignment with the slits 19 in the axial direction, so that the number of the outlet holes 16 is equal to the number of the slits 19. The gate holes 17 of the fixed mold half 3 as well as the cavities 1 are provided in the same number as the outlet holes 16. Thus, more than two products P can be molded at a time and the gates of these products P can be severed at a time.

Additionally, in case that the slits 19 are provided in plural pairs, the voltage is applied equally to all sets of two diametrically opposed sections of the body 18, so that the hot nozzle 6, particularly the front part of the nozzle portion 5 has a uniform temperature distribution in the circumferential direction with the aid of the circumferentially equally spaced arrangement of the slits 19. With such a uniform temperature distribution of the hot nozzle 6, the resin within the outlet holes 16 may have a uniform temperature. Thus, even if a plurality of products P are molded, the products P may have a uniform quality and the gates of the products P may have smooth severed surfaces through the severing operation between the outlet holes 16 and their corresponding gate holes 17 facing thereto. Consequently, a number of the products P having excellent quality can be obtained at a time.

A second modification of the above embodiment will now be explained with reference to FIGS. 10 to 14. A hot nozzle 56 of this modification is adapted for use with the side-gate molding system described with reference to FIGS. 1 to 6, and the hot nozzle 56 has the same basic construction as the hot nozzle 6.

Figure 10:
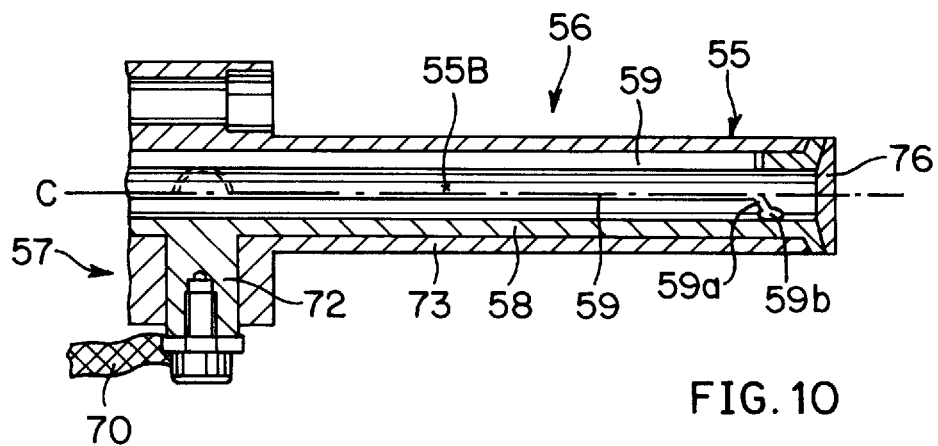
FIG. 10 is a sectional view of a hot nozzle according to a second modification of the embodiment and corresponds to a sectional view taken along line X—X in FIG. 12.

Thus, as shown in FIG. 10, the hot nozzle 56 has a tubular nozzle portion 55 adapted to be inserted into the nozzle hole 4, a base portion 57 to be fixed to the manifold 9, and a channel 55B through which the molten resin flows. The hot nozzle 56 includes a tubular body 58 made of a conductive metal having a predetermined resistance. A pair of longitudinal slits 59 are formed in the body 58 in diametrically opposed relationship with each other and extend from the rear end of the body 58 to the front end thereof except a portion of the front end. A pair of connecting portions 73 (one shown in FIG. 10) are formed with the body 58 on the side of the base portion 57 and protrude outwardly therefrom. The connecting portions 72 are displaced from the longitudinal slits 59 in the circumferential direction of the body 58 by an angle of 90°. The connecting portions 73 are connected to the temperature control unit via lead wires 70.

The outer surface of the body 58 is coated with a film (not shown) made of a thermal and electrical insulation material except for the outer end of the connecting portions 73. The body 58 is covered by a protection tube 53 made of ceramic or iron.

Figure 11:
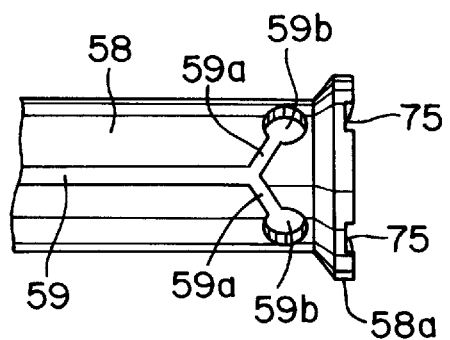
FIG. 11 is a side view of a front portion of a body of the hot nozzle.
Figure 12:
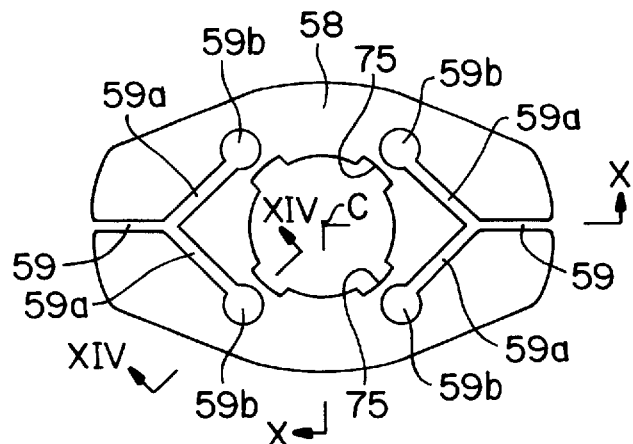
FIG. 12 is a schematic view showing the front portion of the body in a developed form about the central axis of the body.

As shown in FIGS. 11 and 12, with this modification, each of the longitudinal slots 59 has a front portion including a pair of bifurcated parts 59a. The bifurcated parts 59a extend obliquely relative to the longitudinal axis of the slot 59 in a symmetrical manner, so that the bifurcated parts 59a extend away from each other in a forward direction. Each of the bifurcated parts 59a has a substantially circular frontmost end 59b which has a diameter greater than the width of the bifurcated parts 59a, so that the circular frontmost ends 59b which are four in number are formed in the body 58. As shown in FIG. 12, the circular frontmost ends 59b are equally spaced from each other in the circumferential direction of the body 58 about its central axis C.

As shown in FIG. 11, the body 58 has an outwardly expanding flange-like front end part 58b having a front opening, and the circular frontmost ends 59b of the slots 59 are positioned adjacent the front end part 58b.

Figure 13:
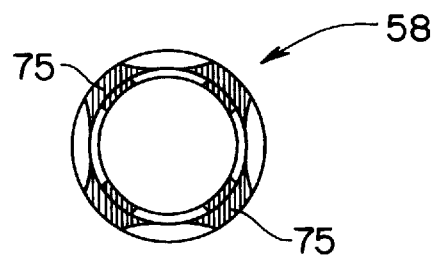
FIG. 13 is a front view of the body.
Figure 14:
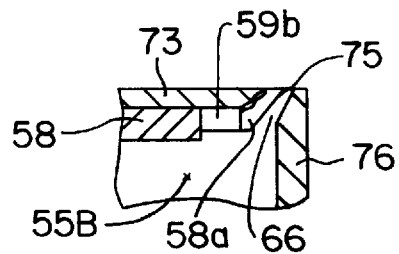
FIG. 14 is a sectional view of the hot nozzle and corresponds to a sectional view taken along line XIV—XIV in FIG. 12.

The front end part 58b of the body 58 has an annular end surface which includes four radial recesses 75 (see FIG. 13). The radial recesses 75 are in alignment with the circular frontmost ends 59b of the slots 59 in the axial direction of the body 58. As shown in FIG. 10, the front opening of the front end part 58b is closed by a lid plate 76 which is fixed to the front end part 58b by means of welding or like. As shown in FIG. 14, the lid plate 76 cooperates with the radial recesses 75 of the front end part 58b to form outlet holes 66 which are in communication with the channel 55B of the molten resin. The bottoms of the radial recesses 75 and a rear peripheral surface of the lid plate 75 confronting thereto are inclined forwardly outwardly, so that the outlet holes 66 extend obliquely outwardly from the channel 55B.

With this modification, when the power of low voltage and high current is applied to the hot nozzle 56 or the body 58 via the lead wires 70, in the same manner as described in connection with the hot nozzle 6 of the above embodiment, the body 58 is heated by itself mainly at its front part including the front end part 58b or an area indicted by R in FIG. 12. Since each of the longitudinal slits 59 has the bifurcated parts 59a each having the circular frontmost and 59b which is positioned adjacent the corresponding outlet hole 66, a part of the body 58 (an area part indicated by R1 in FIG. 12) between the circular frontmost and 59b and the corresponding outlet hole 66 is heated particularly rapidly than other parts. This means that the resin within each of the outlet holes 66 can be rapidly heated. Here, the heating conditions (electrical condition and physical condition) of the area parts R1 are equal to each other, so that the resin within the outlet holes 66 can be equally heated. Therefore, the products may have a uniform quality.

As described above, with the hot nozzle 56 of this modification, although four outlet holes 66 are provided in the hot nozzle 56, only one pair of the connecting portions 73 as well as only one pair of the longitudinal slits 59 are required as in the hot nozzle 6 of FIGS. 1 to 6. Therefore, this modification is simple in construction and can be easily controlled by the temperature control unit in comparison with the hot nozzle of FIGS. 8 and 9 which require two pairs of the slits 19 and two pairs of the connecting portions 22A and 22B.

Further, in the embodiment shown in FIGS. 1 to 6, the axial movement of the hot nozzle 6 between the advanced position and the retracted position is performed through the pressing force applied by the injection machine and the returning force of the belleville springs 26. Therefore, only the belleville springs 26 are additionally incorporated for the shifting movement of the hot nozzle 6. Therefore, the above embodiment is preferable in that the construction and the control of the movement are very simplified and that the system can be manufactured at relatively lower cost. However, in place of this construction, an actuator such as an air cylinder which is driven in response to the molding cycle of the injection machine may be incorporated for the shifting movement of the hot nozzle 6.

Furthermore, with the above embodiment, the belleville springs 26 are incorporated as biasing means to normally biasing the hot nozzle 6 in the rearward direction, so that the biasing force can be easily adjusted, by determining the number of the belleville springs 26, to a suitable value in response to the injection molding machine to which the hot nozzle 6 is adapted. However, a compression coil spring may be used as the biasing means in place of the belleville spring 26. Further, an air pressure or other biasing means may be used in place of the springs 26.

Although in the above embodiment, the hot nozzle 6 is moved relative to the mold (the fixed mold half 3) for severing the gates, the fixed mold half 3 may be moved relative to the hot nozzle 6 for severing the gates.

With the above embodiment, the advancing movement of the hot nozzle 6 is stopped through abutment of the front surface 18a of the nozzle portion 5 on the bottom surface 4c of the nozzle hole 4, and the retracting movement of the hot nozzle 6 is stopped through abutment of the hot nozzle 6 on the bottom of the recess 11 of the manifold 9. These stopping means are advantageous in that the construction of the molding system is very simple since no additional member is required for stopping the movement of the hot nozzle 6. However, such stopper means may be replaced by different types of stopper means which are disposed between a fixed member (such as the fixed mold half 3 or the fixed base 10) and the hot nozzle 6 for stopping the hot nozzle 6. For example, a first stopper member is mounted on the hot nozzle 6 and second stopper members are mounted on the fixed member at two positions for engaging the first stopper member at the advanced and the retracted positions, respectively.

While the invention has been described with reference to a preferred embodiment, it is to be understood that modifications or variations may be easily made without departing from the spirit of this invention which is defined by the appended claims.

What is claimed is:

1. A hot nozzle for use with a side-gate runnerless injection molding system wherein a molten resin injected from an injection molding machine is charged into cavities of a mold via the hot nozzle in a lateral direction therefrom, and wherein gates of molded products are severed by a relative movement between the hot nozzle and the mold, comprising:

a base portion; and a nozzle portion adapted to be inserted into a nozzle hole formed in the mold;

said base portion and said nozzle portion being formed by a tubular body made of a conductive metal having a predetermined electrical resistance, said tubular body including a plurality of outlet holes formed in a front part of said nozzle portion and opened in a lateral side thereof, and including at least one pair of longitudinal slits extending substantially over the length of said tubular body in an axial direction thereof except at least said front part of said nozzle portion to divide said body into at least two sections, each of said sections including means for connection to a source of electric power, so that said tubular body is heated mainly at said front part of said nozzle portion when electric power is applied between two sections of said tubular body divided by said slits, each of said slits having a front portion including a pair of bifurcated parts, and each of said bifurcated parts including a front end positioned adjacent corresponding one of said outlet holes.

2. The hot nozzle as defined in claim 1 wherein said front end of each of said bifurcated parts is in alignment with corresponding one of said outlet holes in a longitudinal direction of said body.

3. The hot nozzle as defined in claim 1 wherein said slits are two in number and confront each other in a diametrical direction of said body, and wherein said front ends of said bifurcated parts of said slits as well as said outlet holes are four in number and are equally spaced from each other in a circumferential direction of said body.

4. The hot nozzle as defined in claim 1 wherein said front end has a substantially circular configuration and has a diameter greater than the width of said bifurcated parts.

* * * * *